(12) United States Patent
Suga

(10) Patent No.: US 9,709,938 B1
(45) Date of Patent: Jul. 18, 2017

(54) ADHESIVE FOR ADHESIVE LAYER OF FIXING MEMBER, FIXING MEMBER, FIXING DEVICE, AND IMAGE-FORMING APPARATUS

(71) Applicant: FUJI XEROX CO., LTD., Tokyo (JP)

(72) Inventor: Takanori Suga, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/225,881

(22) Filed: Aug. 2, 2016

(30) Foreign Application Priority Data

Mar. 10, 2016 (JP) .................................. 2016-046464

(51) Int. Cl.
| | |
|---|---|
| G03G 15/20 | (2006.01) |
| C09J 183/04 | (2006.01) |
| C08J 5/12 | (2006.01) |
| C08K 3/22 | (2006.01) |

(52) U.S. Cl.
CPC ............ *G03G 15/206* (2013.01); *C08J 5/124* (2013.01); *C09J 183/04* (2013.01); *C08J 2383/07* (2013.01); *C08K 2003/2227* (2013.01); *C09J 2483/006* (2013.01)

(58) Field of Classification Search
None
See application file for complete search history.

(56) References Cited

U.S. PATENT DOCUMENTS 5,621,512 A 4/1997 Uehara et al.

FOREIGN PATENT DOCUMENTS

| JP | 8-262903 A | 10/1996 |
|---|---|---|
| JP | 11-167300 A | 6/1999 |
| JP | 2007-179009 A | 7/2007 |

*Primary Examiner* — Clayton E Laballe
*Assistant Examiner* — Jas Sanghera
(74) *Attorney, Agent, or Firm* — Sughrue Mion, PLLC

(57) ABSTRACT

Disclosed is an adhesive for an adhesive layer of a fixing member including a substantially cylindrical substrate, an elastic layer around the substrate, a surface layer covering the elastic layer, and the adhesive layer between the elastic layer and the surface layer. The adhesive contains a dialkylpolyorganosiloxane having crosslinking groups and a dialkylpolyorganosiloxane having vinyl groups. The molar ratio of the crosslinking groups to the vinyl groups in the adhesive is about 1.1 to about 4.

5 Claims, 2 Drawing Sheets

ADHESIVE FOR ADHESIVE LAYER OF FIXING MEMBER, FIXING MEMBER, FIXING DEVICE, AND IMAGE-FORMING APPARATUS

CROSS-REFERENCE TO RELATED APPLICATIONS

This application is based on and claims priority under 35 USC 119 from Japanese Patent Application No. 2016-046464 filed Mar. 10, 2016.

BACKGROUND (i) Technical Field

The present invention relates to adhesives for adhesive layers of fixing members, fixing members, fixing devices, and image-forming apparatuses.

(ii) Related Art

Electrophotographic image-forming apparatuses, such as copiers and printers, form an image on a recording medium such as recording paper by fixing an unfixed toner image using a fixing device. Examples of fixing devices for use in such image-forming apparatuses include roller-to-roller fixing devices and belt-nip fixing devices. A roller-to-roller fixing device includes a thermal fixing roller serving as a fixing member and a pressing roller serving as a pressing member. A belt-nip fixing device, which is a technology for achieving, for example, faster image-forming apparatuses, includes a rotatable fixing roller serving as a fixing member, a belt member movable in contact with the fixing roller, and a non-rotatable pressure pad serving as a pressing member inside the belt member. The surface of the fixing roller is elastically deformable. The pressure pad presses the belt member against the fixing roller to form a contact area with the fixing roller, thereby forming a nip through which a recording medium passes between the belt member and the fixing roller.

Elastic rollers are used as fixing rollers in fixing devices, particularly for color applications. Elastic rollers are often made of silicone rubbers, which are a type of heat-resistant rubber. Recently, many elastic rollers have been proposed that are covered with a tube such as a fluoropolymer tube as a surface layer. This surface layer serves as a toner release layer to improve compatibility with toners for oil-free fixing, which, unlike conventional toners, contain wax so that no oil has to be used to assist in toner release.

An example method for manufacturing an elastic roller covered with a fluoropolymer tube is one-piece molding, which involves molding a layer of fluoropolymer formed in a tubular shape in advance and an elastic layer containing a rubber material in a single mold to bond them together. Another method involves forming and vulcanizing an elastic layer and then covering the elastic layer with a fluoropolymer tube. Yet another method involves coating an elastic layer with a fluoropolymer dispersion, for example, by spraying or dipping, and then baking the coating. Tubes are often used, for example, for reasons of wear resistance. In this case, for example, an adhesive composition is applied to the elastic layer before the elastic layer is covered with the tube to obtain a fixing roller.

When subjected to a heat aging test that simulates the conditions where a fixing roller is used in an image-forming apparatus, a fixing roller manufactured by one-piece molding may undergo cohesive failure in the elastic layer. A fixing roller manufactured by covering an elastic layer with a tube in a later step includes an adhesive layer that bonds together the elastic layer and the surface layer; however, it may have insufficient adhesion strength because of separation between the layers or the insufficient strength of the adhesive layer itself.

SUMMARY

According to an aspect of the invention, there is provided an adhesive for an adhesive layer of a fixing member including a substantially cylindrical substrate, an elastic layer around the substrate, a surface layer covering the elastic layer, and the adhesive layer between the elastic layer and the surface layer. The adhesive contains a dialkylpolyorganosiloxane having crosslinking groups and a dialkylpolyorganosiloxane having vinyl groups. The molar ratio of the crosslinking groups to the vinyl groups in the adhesive is about 1.1 to about 4.

BRIEF DESCRIPTION OF THE DRAWINGS

Exemplary embodiments of the present invention will be described in detail based on the following figures, wherein.

DETAILED DESCRIPTION

Exemplary embodiments of the present invention will now be described. These exemplary embodiments are for illustration purposes only and are not intended to limit the scope of the invention.

Fixing Device, Fixing Member, and Adhesive for Adhesive Layer of Fixing Member

An example fixing device according to an exemplary embodiment will now be described. The fixing device according to this exemplary embodiment includes, for example, a rotatable fixing member, a belt member movable in contact with the fixing member, and a nip-forming member disposed opposite the fixing member with the belt member therebetween. The nip-forming member presses the belt member against the fixing member to form a nip through which a recording medium passes between the fixing member and the belt member. The fixing device may further include a sliding sheet member extending between the nip-forming member and the belt member from upstream in the travel direction of the recording medium.

Figure 1:
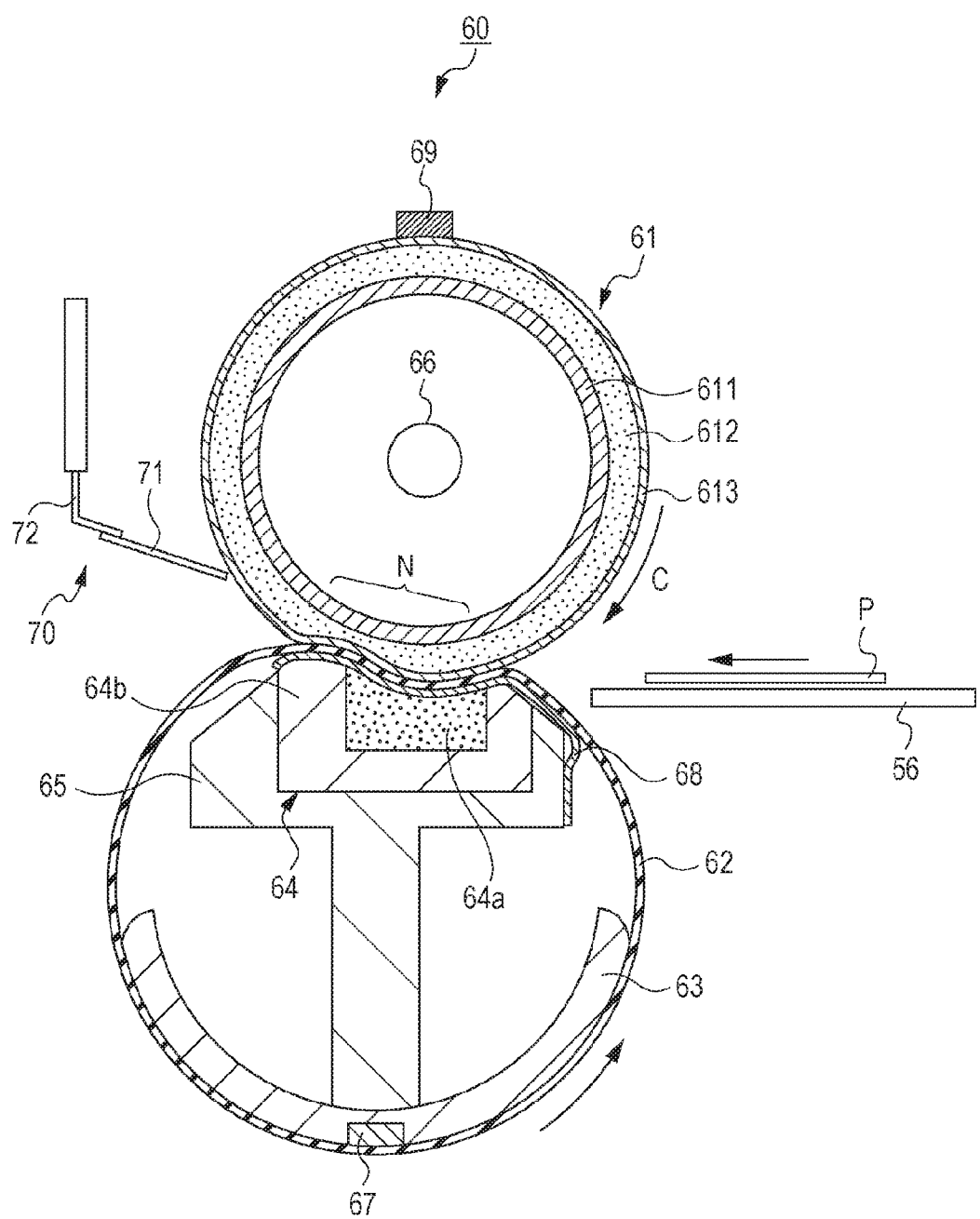
FIG. 1 is a schematic view of an example fixing device according to an exemplary embodiment of the invention.

FIG. 1 is a schematic cross-sectional view of an example fixing device 60 according to this exemplary embodiment. The fixing device 60 shown in FIG. 1 includes a fixing roller 61 (an example of a fixing member), a pressing belt 62 (an example of a belt member) movable in contact with the fixing roller 61, and a pressing pad 64 (an example of a nip-forming member) disposed opposite the fixing roller 61 with the pressing belt 62 therebetween. The pressing pad 64 presses the pressing belt 62 against the fixing roller 61 to form a nip N through which a recording medium 56 passes between the fixing roller 61 and the pressing belt 62. The fixing device 60 further includes a sliding sheet member 68 extending between the pressing pad 64 and the pressing belt 62 from upstream in the travel direction of the recording medium 56.

The fixing device 60 shown in FIG. 1 includes no support roller or pressing roller for supporting the pressing belt 62;

instead, the pressing belt 62 is guided by a belt guide 63, described later, and is moved by the driving force of the fixing roller 61. This type of fixing device is often called "free-belt-nip fixing device" to distinguish it from those including a support roller or pressing roller.

The fixing roller 61 is a cylindrical or substantially cylindrical roller and is rotatably supported. The fixing roller 61 includes a substrate (cylindrical or substantially cylindrical substrate) 611 made of a material such as metal, an elastic layer 612 disposed around the substrate 611, and a surface layer 613 disposed on the elastic layer 612. The fixing roller 61 will be described in detail later.

A heater, such as a heater lamp 66, is disposed as a heat source inside the fixing roller 61. Disposed around the fixing roller 61 are a separating member 70 for separating the recording medium 56 after fixing and a temperature sensor 69 for controlling the surface temperature of the fixing roller 61. The separating member 70 includes a separating baffle 71 disposed adjacent to the fixing roller 61 and a holder 72 holding the separating baffle 71. The separating baffle 71 is oriented opposite to the rotational direction C of the fixing roller 61 (i.e., in the counter direction).

The pressing belt 62 is rotatably supported by the pressing pad 64 and the belt guide 63, which are disposed inside the pressing belt 62. A seamless endless belt originally formed in a cylindrical shape may be used as the pressing belt 62 to avoid image defects due to seams. The pressing belt 62, however, need not be a seamless belt, but may instead be, for example, a seamed belt.

The pressing pad 64 is supported inside the pressing belt 62 by a holder 65 made of, for example, metal. The pressing pad 64 is disposed opposite the fixing roller 61 with the pressing belt 62 therebetween. The pressing pad 64 presses the pressing belt 62 against the fixing roller 61 to form the nip N through which the recording medium 56 passes between the fixing roller 61 and the pressing belt 62. The pressing pad 64 includes two pressing parts with different hardnesses arranged in the travel direction of the recording medium 56: a prenip member 64a and a separating nip member 64b. The prenip member 64a, which is located on the entry side (upstream), is an elastic member made of, for example, rubber. The separating nip member 64b, which is located on the exit side (downstream), is a hard pressing member made of, for example, metal. The pressure in the nip N is higher on the exit side than on the entry side so that, for example, the recording medium 56 may be smoothly separated. The prenip member 64a and the separating nip member 64b are supported by the holder 65 and press the fixing roller 61 from inside the pressing belt 62 with the sliding sheet member 68 therebetween. The sliding sheet member 68 has a low-friction layer such as a fiberglass sheet containing Teflon® or a fluoropolymer sheet.

The holder 65 includes a lubricating member 67 extending along the length of the fixing device 60. The lubricating member 67 is disposed in contact with the inner surface of the pressing belt 62. The lubricating member 67 supplies a lubricant such as an amino-modified silicone oil to the sliding area between the pressing belt 62 and the sliding sheet member 68. This may reduce the sliding resistance between the pressing belt 62 and the pressing pad 64 with the sliding sheet member 68 therebetween.

The fixing roller 61 of the fixing device 60 shown in FIG. 1 is coupled to a drive motor (not shown) and is rotated in the direction of arrow C. As the fixing roller 61 is rotated, the pressing belt 62 is rotated in the same direction. A toner image P is electrostatically transferred to the recording medium 56 in a second transfer section 20 of an image-forming apparatus shown in FIG. 2, described later. The recording medium 56 is then transported to the nip N between the fixing roller 61 and the pressing belt 62 shown in FIG. 1 by a transport unit (not shown). As the recording medium 56 passes through the nip N, the toner image P is fixed to the recording medium 56, for example, by the pressure in the nip N and heat supplied from the fixing roller 61. After passing through the nip N, the recording medium 56 is separated from the fixing roller 61 by the separating member 70 and is output from the fixing device 60. The fixing process is complete.

The sliding sheet member 68 extends between the pressing pad 64 and the pressing belt 62 from upstream in the travel direction of the recording medium 56. The sliding sheet member 68 may be arranged to extend over the entire area between the pressing pad 64 and the pressing belt 62, for example, to reduce the sliding resistance between the pressing belt 62 and the pressing pad 64 with the sliding sheet member 68 therebetween. The portion of the sliding sheet member 68 upstream of the nip N is at least partially secured to the holder 65, for example, by a fastener (not shown). Although the portion of the sliding sheet member 68 upstream of the nip N is secured to the holder 65 in the example shown in FIG. 1, the sliding sheet member 68 need not be secured to the holder 65, but may instead be secured to any other member disposed upstream of the nip N and having sufficient area for the sliding sheet member 68 to be secured thereto. The end of the sliding sheet member 68 downstream in the travel direction of the recording medium 56 may be left free without being secured to any other member, for example, to reduce strain in the sliding sheet member 68. This sliding sheet member 68 may reduce, for example, the sliding resistance between the pressing belt 62 and the pressing pad 64 with the sliding sheet member 68 therebetween during the rotation of the pressing belt 62.

The prenip member 64a of the pressing pad 64 is made of, for example, an elastomer such as silicone rubber or fluoroelastomer, or a leaf spring. The separating nip member 64b of the pressing pad 64 is made of, for example, a heat-resistant resin such as polyphenylene sulfide (PPS), polyimide, polyester, or polyamide, or a metal such as iron, aluminum, or stainless steel.

The sliding sheet member 68 may be made of a fluoropolymer, for example, for reasons of wear resistance and lubricant retention. Examples of sliding sheet members made of fluoropolymers include fluoropolymer sheets, fluoropolymer coatings formed on substrates such as glass fabrics, and fluoropolymer sheets laminated on substrates such as glass fabrics. Examples of fluoropolymers include polytetrafluoroethylene (PTFE), polychlorotrifluoroethylene, polyhexafluoropropylene, polyvinyl fluoride, polyvinylidene fluoride, polydichlorodifluoroethylene, and copolymers thereof. For example, PTFE may be used for reasons of wear resistance.

Examples of lubricants include silicone oils containing fluorinated lubricants, such as X-22-9446 oil (dynamic viscosity: 240 to 330 $mm^2/s$ (JIS Z 8803)) available from Shin-Etsu Chemical Co., Ltd.

The fixing roller 61, serving as a fixing member, of the fixing device 60 according to this exemplary embodiment includes a cylindrical or substantially cylindrical substrate 611, an elastic layer 612 around the substrate 611, a surface layer 613 covering the elastic layer 612, and an adhesive layer between the elastic layer 612 and the surface layer 613. The adhesive layer contains a crosslinked product of a dialkylpolyorganosiloxane having crosslinking groups and a dialkylpolyorganosiloxane having vinyl groups. The molar ratio of remaining crosslinking groups to crosslinked vinyl groups in the crosslinked product is 0.1 to 3.0 or about 0.1 to about 3.0.

As discussed in the Related Art section, when subjected to a heat aging test that simulates the conditions where a fixing roller is used in an image-forming apparatus, a fixing roller manufactured by one-piece molding may undergo cohesive failure in the elastic layer. A fixing roller manufactured by covering an elastic layer with a tube in a later step includes an adhesive layer that bonds together the elastic layer and the surface layer; however, it may have insufficient adhesion strength because of separation between the layers or the insufficient strength of the adhesive layer itself. The fixing roller according to this exemplary embodiment is typically manufactured by forming and vulcanizing an elastic layer and then covering the elastic layer with a surface layer in a later step. This method, however, may result in insufficient adhesion strength. Accordingly, the inventor has developed the following method.

The inventor has found a method for improving the adhesion strength of an adhesive, for an adhesive layer of a fixing roller, containing a dialkylpolyorganosiloxane having crosslinking groups and a dialkylpolyorganosiloxane having vinyl groups by increasing the proportion of the crosslinking groups to the vinyl groups in the adhesive, thereby improving the adhesion strength of the fixing roller. That is, the inventor has found a method for improving the adhesion strength of an adhesive layer containing a crosslinked product of a dialkylpolyorganosiloxane having crosslinking groups and a dialkylpolyorganosiloxane having vinyl groups by increasing the proportion of remaining crosslinking groups to crosslinked vinyl groups in the crosslinked product, thereby improving the adhesion strength of the fixing roller. This method, when used for a fixing roller including an adhesive layer formed on the elastic layer after the formation and vulcanization of the elastic layer to prevent the separation between the elastic layer and the adhesive layer, may improve the overall adhesion strength of the fixing roller and may thus provide good durability and good and stable image quality while preventing color spots. This method may also improve the initial adhesion and the resistance to thermal stress and may thus provide good and stable image quality. Color spots may occur as follows. When an elastic layer and an adhesive layer of a fixing roller are separated from each other in a certain area, its pressure varies in that area, which results in uneven pressure in the nip. As a result, part or all of a toner image is poorly fixed to a recording medium, thus leaving color spots.

Increasing the proportion of the crosslinking groups to the vinyl groups in the adhesive may have the following effect. When a diluted adhesive is applied to the rubber forming an elastic layer, a crosslinking agent having a low molecular weight is absorbed into the network structure of the elastic layer; therefore, less crosslinking agent remains. This decreases the strength of the adhesive after curing and thus decreases the strength of the fixing roller. By increasing the proportion of the crosslinking groups to the vinyl groups in the adhesive, a sufficient amount of crosslinking groups may be left for a curing reaction even if the crosslinking agent is absorbed into the rubber forming the elastic layer.

The adhesive layer preferably has a thickness of 10 µm or more or about 10 µm or more, more preferably 10 to 50 µm or about 10 to about 50 µm, even more preferably 15 to 30 µm or about 15 to about 30 µm. If the adhesive layer has a thickness of less than 10 µm, the elastic layer and the adhesive layer may be readily separated because of the insufficient adhesion of the adhesive layer. If the adhesive layer has a thickness of more than 50 µm, a failure may occur in the adhesive layer itself.

The adhesive that forms the adhesive layer of the fixing member is a silicone adhesive containing a dialkylpolyorganosiloxane having crosslinking groups and a dialkylpolyorganosiloxane having vinyl groups. Examples of dialkylpolyorganosiloxanes having crosslinking groups include trimethylsiloxy-terminated dimethylsiloxane-methylhydrosiloxane copolymers having silicon-bonded hydrogen atoms as crosslinking groups. Examples of dialkylpolyorganosiloxanes having vinyl groups include dimethylpolyorganosiloxanes having vinyl groups.

The adhesive layer formed from the adhesive contains a crosslinked product of a dialkylpolyorganosiloxane having crosslinking groups and a dialkylpolyorganosiloxane having vinyl groups. It should be noted that it is impractical to determine the specific structure of a crosslinked product of a dialkylpolyorganosiloxane having crosslinking groups and a dialkylpolyorganosiloxane having vinyl groups since it cannot be represented by a single structural formula.

The molar ratio of the crosslinking groups to the vinyl groups in the adhesive for the adhesive layer is 1.1 to 4 or about 1.1 to about 4, preferably 2 to 4 or about 2 to about 4, more preferably 2.5 to 3.5 or about 2.5 to about 3.5. If the molar ratio of the crosslinking groups to the vinyl groups is less than 1.1, the adhesive may have low adhesion strength. If the molar ratio of the crosslinking groups to the vinyl groups is more than 4, the fixing roller may have excessive hardness.

The molar ratio of remaining crosslinking groups to crosslinked vinyl groups in the crosslinked product in the adhesive layer is 0.1 to 3.0 or about 0.1 to about 3.0, preferably 0.5 to 2.5 or about 0.5 to about 2.5, more preferably 1.0 to 2.0 or about 1.0 to about 2.0. If the molar ratio of remaining crosslinking groups to crosslinked vinyl groups is less than 0.1, the adhesive may have low adhesion strength. If the molar ratio of remaining crosslinking groups to crosslinked vinyl groups is more than 3.0, the fixing roller may have excessive hardness.

The adhesive layer may contain a silane coupling agent. Examples of silane coupling agents include glycidoxy-containing silane coupling agents. Examples of glycidoxy-containing silane coupling agents include glycidoxyalkyltrialkoxysilanes, glycidoxyalkyldialkoxysilanes, and glycidoxyalkylalkoxysilanes, such as glycidoxypropyltrimethoxysilane, glycidoxypropyltriethoxysilane, glycidoxypropylmethyldimethoxysilane, and glycidoxypropylmethyldiethoxysilane. Glycidoxyalkyltrialkoxysilanes are preferred for reasons of reactivity. More preferred are glycidoxyalkyltrialkoxysilanes in which the alkyl group has 1 to 5 carbon atoms and the alkoxy groups have 1 to 3 carbon atoms. Even more preferred is glycidoxypropyltrimethoxysilane, in which the alkyl group has 3 carbon atoms and the alkoxy groups have 1 carbon atom.

The silane coupling agent is preferably present in the adhesive layer in an amount of 5% to 30% by mass, more preferably 5% to 20% by mass, of the total mass of the adhesive layer. If the silane coupling agent is present in the adhesive layer in an amount of less than 5% by mass, the adhesive layer may have insufficient adhesion. If the silane coupling agent is present in the adhesive layer in an amount of more than 30% by mass, the silane coupling agent may gel during manufacture.

The substrate 611 of the fixing roller 61 is made of a material, such as a metal, alloy, ceramic, or fiber-reinforced metal (FRM), with high thermal conductivity. For example, the substrate 611 is made of iron, aluminum (e.g., A-5052), stainless steel, or copper.

A typical outer diameter of the substrate 611 is, for example, 10 to 50 mm. A typical wall thickness of the substrate 611 is, for example, about 0.5 to about 4 mm if the substrate 611 is made of aluminum, or about 0.1 to about 2 mm if the substrate 611 is made of stainless steel or iron.

Examples of materials for the elastic layer 612 of the fixing roller 61 include elastomers such as silicone rubbers and fluoroelastomers. Examples of silicone rubbers include room-temperature vulcanizing (RTV) silicone rubbers and high-temperature vulcanizing (HTV) silicone rubbers. Specific examples include polydimethylsilicone (MQ) rubber, methylvinylsilicone (VMQ) rubber, methylphenylsilicone (PMQ) rubber, and fluorosilicone (FVMQ) rubber. For example, the elastic layer 612 may be made of a silicone rubber obtained by crosslinking a dialkylpolyorganosiloxane, such as dimethylpolyorganosiloxane, having vinyl groups with a silicone resin such as a trimethylsiloxy-terminated dimethylsiloxane-methylhydrosiloxane copolymer having silicon-bonded hydrogen atoms. The elastic layer 612 may be formed either by one-piece molding or by flow coating, provided that the desired shape is achieved.

The elastic layer 612 has a thickness of, for example, 0.2 to 3 mm, preferably 0.3 to 1 mm.

The surface layer 613 of the fixing roller 61 is made of, for example, a fluoropolymer. Examples of fluoropolymers include polytetrafluoroethylene (PTFE) and tetrafluoroethylene-perfluoro(alkyl vinyl ether) copolymers (PFA) such as tetrafluoroethylene-perfluoro(methyl vinyl ether) copolymer (MFA), tetrafluoroethylene-perfluoro(ethyl vinyl ether) copolymer (EFA), and tetrafluoroethylene-perfluoro(propyl vinyl ether) copolymer.

The surface layer 613 has a thickness of, for example, 5 to 100 μm, preferably 10 to 40 μm.

The fixing roller 61 may be manufactured, for example, by the following method. An adhesive composition containing predetermined amounts of adhesive and other optional additives is prepared. A primer-coated cylindrical core is coated on its outer surface with an elastic layer composition to a predetermined thickness. The coating is baked, for example, at 140° C. to 250° C. for 30 minutes to 3 hours. The coating is allowed to cool to room temperature to obtain an elastic layer. This elastic layer is coated with the adhesive composition to a thickness of, for example, 10 μm or more. A fluoropolymer tube such as a perfluoroalkoxy (PFA) tube, serving as a surface layer, is attracted to the inner surface of a cylindrical mold by creating a vacuum. The elastic layer coated with the adhesive composition is then inserted into the mold. After the insertion is complete, the elastic layer is covered with the fluoropolymer tube by removing the vacuum to obtain a fixing roller.

The fixing device 60 according to this exemplary embodiment is a roller-to-belt fixing device including the fixing roller according to this exemplary embodiment as a fixing member and a pressing belt as a pressing member. The fixing device 60, however, need not be a roller-to-belt fixing device, but may instead be a roller-to-roller fixing device including the fixing roller according to this exemplary embodiment as a fixing member and a pressing roller as a pressing member.

Image-Forming Apparatus

An image-forming apparatus according to an exemplary embodiment may be any type of image-forming apparatus including the fixing member according to the foregoing exemplary embodiment. For example, the image-forming apparatus includes an image carrier having a surface, a charging unit that charges the surface of the image carrier, a latent-image forming unit that forms an electrostatic latent image on the surface of the image carrier, a developing unit that develops the electrostatic latent image formed on the surface of the image carrier with a developer to form a toner image, a transfer unit that transfers the toner image to a medium, and a fixing device that fixes the toner image to the medium. The fixing device includes the fixing member according to the foregoing exemplary embodiment. The image-forming apparatus according to this exemplary embodiment may optionally include an image-carrier cleaning unit that cleans the surface of the image carrier by removing residual toner and other contaminants from the image carrier after the transfer.

The image-forming apparatus according to this exemplary embodiment will now be described with reference to the drawings, although the following exemplary embodiment is not intended to limit the scope of the present invention.

Figure 2:
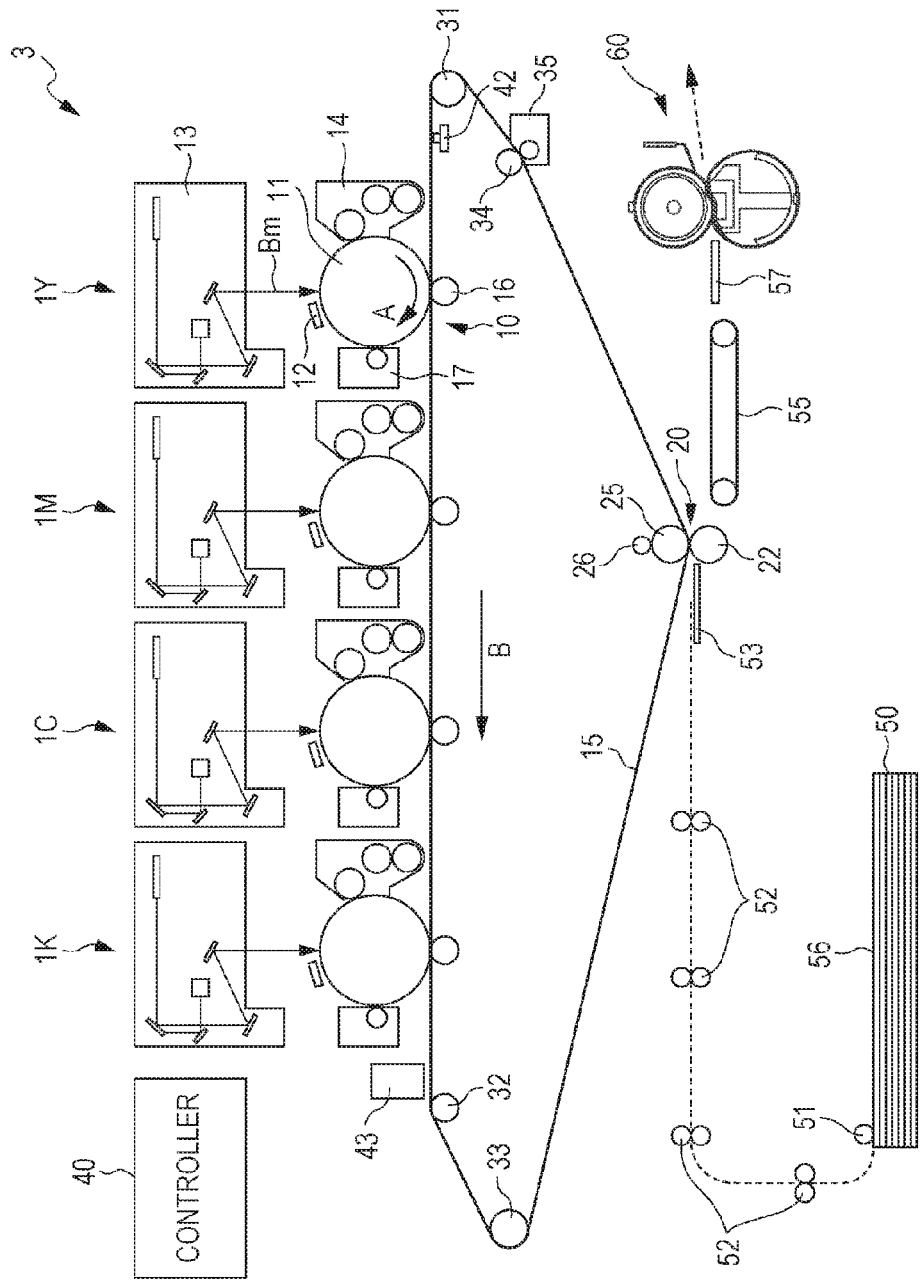
FIG. 2 is a schematic view of an example image-forming apparatus according to an exemplary embodiment of the invention.

FIG. 2 is a schematic view of an example image-forming apparatus according to this exemplary embodiment. An image-forming apparatus 3 shown in FIG. 2 includes electrophotographic image-forming units 1Y, 1M, 1C, and 1K that form toner images of different colors; first transfer sections 10 that sequentially transfer (first transfer) the toner images from the image-forming units 1Y, 1M, 1C, and 1K to an intermediate transfer belt 15; a second transfer section 20 that simultaneously transfers (second transfer) the superimposed toner images from the intermediate transfer belt 15 to a recording medium (e.g., recording paper) 56; and a fixing device 60 that fixes the toner images to the recording medium 56. The image-forming apparatus 3 further includes a controller 40 that controls the operation of the individual devices (units).

In this exemplary embodiment, each of the image-forming units 1Y, 1M, 1C, and 1K includes a photoreceptor drum 11 that rotates in the direction of arrow A and various electrophotographic devices arranged around the photoreceptor drum 11. For example, the electrophotographic devices include, in sequence, a charging device 12 that charges the photoreceptor drum 11, a laser exposure device 13 that forms an electrostatic latent image on the photoreceptor drum 11 with an exposure beam Bm, a developing device 14 that contains a toner of the corresponding color and that develops the electrostatic latent image on the photoreceptor drum 11 with the toner, a first transfer roller 16 that transfers the toner image from the photoreceptor drum 11 to the intermediate transfer belt 15 in the first transfer section 10, and a drum cleaner 17 that removes residual toner from the photoreceptor drum 11. These image-forming units 1Y, 1M, 1C, and 1K are arranged substantially in a straight line in the order of yellow (Y), magenta (M), cyan (C), and black (K) from upstream along the intermediate transfer belt 15.

The intermediate transfer belt 15, serving as an intermediate transfer member, is, for example, an endless film belt made of a resin such as polyimide or polyamide containing an appropriate amount of an antistatic agent such as carbon black. The intermediate transfer belt 15 has a volume resistivity of, for example, $10^6$ to $10^{14}$ Ω·cm and a thickness of, for example, about 0.1 mm. The intermediate transfer belt 15 is driven (rotated) at a predetermined speed in the direction of arrow B in FIG. 2 by various rollers. The rollers used in this exemplary embodiment include a drive roller 31, a support roller 32, a tension roller 33, a backup roller 25, and a cleaning backup roller 34. The drive roller 31 rotates the intermediate transfer belt 15 as the drive roller 31 is driven, for example, by a motor (not shown) with good speed stability. The support roller 32 supports the intermediate transfer belt 15, which extends in the direction in which the photoreceptor drums 11 are arranged. The tension roller 33 tensions the intermediate transfer belt 15 and functions as a compensating roller to prevent, for example, meandering of the intermediate transfer belt 15. The backup roller 25 is disposed in the second transfer section 20. The cleaning backup roller 34 is disposed in a cleaning section that scrapes residual toner from the intermediate transfer belt 15.

Each first transfer section 10 includes the first transfer roller 16, which is disposed opposite the photoreceptor drum 11 with the intermediate transfer belt 15 therebetween. The first transfer roller 16 includes, for example, a shaft (not shown) and a sponge layer (not shown) disposed around the shaft and serving as an elastic layer. The shaft is, for example, a cylindrical rod made of a metal such as iron or stainless steel. The sponge layer is, for example, a cylindrical sponge roller made of a blend of acrylonitrile-butadiene rubber (NBR), styrene-butadiene rubber (SBR), and ethylene-propylene-diene rubber (EPDM) containing a conductor such as carbon black. The sponge layer has a volume resistivity of, for example, $10^7$ to $10^9$ Ω·cm. The first transfer roller 16 is pressed against the photoreceptor drum 11 with the intermediate transfer belt 15 therebetween. A voltage (first transfer bias) of opposite polarity to the toner (negative; the same applies hereinafter) is applied to the first transfer rollers 16 so that the toner images are sequentially electrostatically attracted from the photoreceptor drums 11 to the intermediate transfer belt 15 in superimposed registration with each other.

The second transfer section 20 includes a second transfer roller 22 disposed on the image-bearing side of the intermediate transfer belt 15 and the backup roller 25. The backup roller 25 includes, for example, a surface layer formed by a tube of a blend of EPDM and NBR containing carbon and an inner layer made of EPDM. The backup roller 25 has a surface resistivity of, for example, $10^7$ to $10^{10}$ Ω/sq and a hardness of, for example, 70° (Asker durometer Type C, Kobunshi Keiki Co., Ltd.; the same applies hereinafter). The backup roller 25 is disposed on the back surface of the intermediate transfer belt 15 and serves as a counter electrode for the second transfer roller 22. The backup roller 25 is in contact with a power supply roller 26, such as a metal roller, that applies a second transfer bias to the backup roller 25.

The second transfer roller 22 includes, for example, a shaft (not shown) and a sponge layer (not shown) disposed around the shaft and serving as an elastic layer. The shaft is, for example, a cylindrical rod made of a metal such as iron or stainless steel. The sponge layer is, for example, a cylindrical sponge roller made of a blend of NBR, SBR, and EPDM containing a conductor such as carbon black. The sponge layer has a volume resistivity of, for example, $10^7$ to $10^9$ Ω·cm. The second transfer roller 22 is pressed against the backup roller 25 with the intermediate transfer belt 15 therebetween. With the second transfer roller 22 grounded, a second transfer bias is applied between the second transfer roller 22 and the backup roller 25 to transfer the toner images to a recording medium 56 in the second transfer section 20.

An intermediate-transfer-belt cleaner 35 is disposed downstream of the second transfer section 20 along the intermediate transfer belt 15 and can be brought into and out of contact with the intermediate transfer belt 15. The intermediate-transfer-belt cleaner 35 cleans the surface of the intermediate transfer belt 15 by removing residual toner and other contaminants such as paper powder from the intermediate transfer belt 15 after the second transfer. In this exemplary embodiment, a reference sensor (home position sensor) 42 is disposed upstream of the yellow image-forming unit 1Y. The reference sensor 42 generates a reference signal for setting the timing for the image-forming units 1Y, 1M, 1C, and 1K to form an image. An image density sensor 43 for image quality control is disposed downstream of the black image-forming unit 1K. The reference sensor 42 detects a mark on the back surface of the intermediate transfer belt 15 and generates a reference signal. Upon receiving the reference signal, the controller 40 sends a command to start an image-forming process to the image-forming units 1Y, 1M, 1C, and 1K.

The image-forming apparatus 3 according to this exemplary embodiment further includes a medium transport system. The medium transport system includes, for example, a medium tray 50 containing recording media 56, a pickup roller 51 that feeds a recording medium 56 from the medium tray 50, transport rollers 52 that transport the recording medium 56 fed by the pickup roller 51, a transport chute 53 that transports the recording medium 56 transported by the transport rollers 52 to the second transfer section 20, a transport belt 55 that transports the recording medium 56 from the second transfer roller 22 to the fixing device 60 after the second transfer, and a fixing entry guide 57 that guides the recording medium 56 to the fixing device 60.

The basic image-forming process of the image-forming apparatus 3 according to this exemplary embodiment will now be described. The image-forming units 1Y, 1M, 1C, and 1K of the image-forming apparatus 3 shown in FIG. 2 start an image-forming process after an image processing system (IPS) (not shown) processes image data received from, for example, an image input terminal (IIT) (not shown) or a personal computer (PC) (not shown). Specifically, the IPS receives reflectance data and executes predetermined image processing operations, including, for example, shading correction, misalignment correction, brightness/color space conversion, gamma correction, and various image editing operations such as frame deletion, color editing, and position editing. The processed image data is converted into raster data for four colors, i.e., Y, M, C, and K. The raster data is fed to the laser exposure devices 13.

Based on the received raster data, the laser exposure devices 13 expose the photoreceptor drums 11 of the image-forming units 1Y, 1M, 1C, and 1K to an exposure beam Bm emitted from, for example, a semiconductor laser. Specifically, the surfaces of the photoreceptor drums 11 of the image-forming units 1Y, 1M, 1C, and 1K are charged by the charging devices 12 and are then exposed to a scanned exposure beam Bm by the laser exposure devices 13 to form electrostatic latent images. The resulting electrostatic latent images are developed into Y, M, C, and K toner images by the image-forming units 1Y, 1M, 1C, and 1K.

The resulting toner images are transferred from the photoreceptor drums 11 of the image-forming units 1Y, 1M, 1C, and 1K to the intermediate transfer belt 15 in the first transfer sections 10, where the photoreceptor drums 11 are in contact with the intermediate transfer belt 15. Specifically, a voltage (first transfer bias) of opposite polarity to the toner (negative) is applied to the substrate of the intermediate transfer belt 15 by the first transfer rollers 16 in the first transfer sections 10 to sequentially transfer the toner images to the surface of the intermediate transfer belt 15 in superimposed registration with each other.

After the toner images are sequentially transferred to the surface of the intermediate transfer belt 15, the intermediate transfer belt 15 is moved to transport the toner images to the second transfer section 20. When the toner images are transported to the second transfer section 20, the pickup roller 51 of the medium transport system is rotated in synchronization with the transportation of the toner images to the second transfer section 20 to feed a recording medium 56 of predetermined size from the medium tray 50. The recording medium 56 fed by the pickup roller 51 is transported through the transport chute 53 to the second transfer section 20 by the transport rollers 52. The recording medium 56 is temporarily stopped before reaching the second transfer section 20. A registration roller (not shown) is rotated in synchronization with the movement of the intermediate transfer belt 15 to align the recording medium 56 with the toner images on the intermediate transfer belt 15.

The second transfer roller 22 of the second transfer section 20 is pressed against the backup roller 25 with the intermediate transfer belt 15 therebetween. The recording medium 56 transported in synchronization with the movement of the intermediate transfer belt 15 enters the nip between the intermediate transfer belt 15 and the second transfer roller 22. A voltage (second transfer bias) of the same polarity as the toner (negative) is applied between the second transfer roller 22 and the backup roller 25 by the power supply roller 26 to create a transfer field. This transfer field simultaneously electrostatically transfers the unfixed toner images from the intermediate transfer belt 15 to the recording medium 56 in the second transfer section 20, where the second transfer roller 22 is pressed against the backup roller 25.

After the toner images are electrostatically transferred to the recording medium 56, the recording medium is separated from the intermediate transfer belt 15 and is transported by the second transfer roller 22 to the transport belt 55 disposed downstream of the second transfer roller 22 in the travel direction of the recording medium 56. The recording medium 56 is then transported to the fixing device 60 at the optimum speed by the transport belt 55.

As described above, after the recording medium 56 is transported to the fixing device 60, the unfixed toner images are fixed to the recording medium 56 with heat and pressure by the fixing device 60. After the toner images are fixed to the recording medium 56, the recording medium 56 is transported to an output tray disposed in the output section of the image-forming apparatus 3.

After the transfer of the toner images to the recording medium 56 is complete, residual toner and other contaminants deposited on the intermediate transfer belt 15 are transported to the cleaning section by the rotation of the intermediate transfer belt 15 and are removed from the intermediate transfer belt 15 by the cleaning backup roller 34 and the intermediate-transfer-belt cleaner 35.

Although exemplary embodiments of the present invention have been described above, these exemplary embodiments should not be construed as limiting the scope of the invention. It should be understood that various changes, modifications, and improvements are possible within the scope of the invention.

EXAMPLES

The present invention is further illustrated by the following examples and comparative examples, although these examples are not intended to limit the scope of the invention.

Example 1

Preparation of Silicone Rubber Composition

Of 100 parts by mass of dimethylpolyorganosiloxane (vinyl content: 0.08 mmol/g, viscosity (at 25° C.): 30,000 Pa·s), 40 parts by mass of the dimethylpolyorganosiloxane is placed in a mixer in advance. To the mixer is added 100 parts by mass of alumina powder (sodium ion content: 10 ppm, volume average particle size: 3 µm). These materials are mixed and heated at 150° C. for 2 hours. The mixture is diluted with 60 parts by mass of the remaining dimethylpolyorganosiloxane. The mixture is then homogeneously mixed with 4.0 parts by mass of a trimethylsiloxy-terminated dimethylsiloxane-methylhydrosiloxane copolymer (silicon-bonded hydrogen atom content: 3 mmol/g, viscosity (at 25° C.): 5 mPa·s), 10 ppm (on a platinum basis) of chloroplatinic acid-divinyltetramethyldisiloxane complex, serving as a catalyst, 0.1 part by mass of 1-ethynyl-1-cyclohexanol, serving as a curing retarder, and 2 parts by mass of iron(II,III) oxide ($Fe_3O_4$) to obtain a silicone rubber composition.

Formation of Elastic Layer

The above silicone rubber composition is used to form an elastic layer as follows. The silicone rubber composition is dispensed onto the top of a cylindrical core (aluminum core) coated in advance with a primer (DY39-051 A/B, Dow Corning Toray Co., Ltd.) while the cylindrical core is rotated in a horizontal position. The silicone rubber composition is cast into a coating having a predetermined thickness (600 µm) by a blade disposed on the bottom of the cylindrical core. The coating is baked at 200° C. for one hour. After the baking is complete, the coating is allowed to cool to room temperature to obtain an elastic layer.

Preparation of Adhesive Composition

Of 100 parts by mass of dimethylpolyorganosiloxane (vinyl content: 0.08 mmol/g, viscosity (at 25° C.): 30,000 Pa·s), serving as a dialkylpolyorganosiloxane having vinyl groups, 40 parts by mass of the dimethylpolyorganosiloxane is placed in a mixer. To the mixer is added 100 parts by mass of alumina powder (sodium ion content: 10 ppm, volume average particle size: 3 µm). These materials are mixed and heated at 150° C. for 2 hours. The mixture is diluted with 60 parts by mass of the remaining dimethylpolyorganosiloxane. The mixture is then homogeneously mixed with 2.2 parts by mass of a trimethylsiloxy-terminated dimethylsiloxane-methylhydrosiloxane copolymer (silicon-bonded hydrogen atom content: 3 mmol/g, viscosity (at 25° C.): 5 mPa·s), serving as a dialkylpolyorganosiloxane having crosslinking groups, 10 ppm (on a platinum basis) of chloroplatinic acid-divinyltetramethyldisiloxane complex, serving as a catalyst, 0.1 part by mass of 1-ethynyl-1-cyclohexanol, serving as a curing retarder, and 2 parts by mass of iron(II, III) oxide ($Fe_3O_4$). To 100 parts by mass of the mixture is added 5 parts by mass of glycidoxypropyltrimethoxysilane. The mixture containing glycidoxypropyltrimethoxysilane is diluted to 40% by mass with n-heptane to obtain an adhesive composition.

Fabrication of Fixing Roller

The above elastic layer is coated with the above adhesive composition to a thickness of 20 µm. A PFA tube is attracted to the inner surface of a cylindrical mold by creating a vacuum. The elastic layer coated with the adhesive composition is then inserted into the mold. After the insertion is complete, the elastic layer is covered with the PFA tube by removing the vacuum to obtain a fixing roller.

Measurement and Evaluation

The thus-fabricated fixing roller is mounted on an image-forming apparatus (DocuCentre-III C3300 color copier, Fuji Xerox Co., Ltd.) and is subjected to a paper feed test by feeding 150,000 sheets of paper. After the paper feed test, a sample magenta halftone image with an area coverage of 50% is printed and visually evaluated for image quality according to the following criteria. The results are shown in Table 1.

Image Quality Criteria

Excellent: There are no color spots due to separation between the elastic layer and the adhesive layer.

Good: There are very slight color spots due to separation between the elastic layer and the adhesive layer (not problematic for practical use).

Fair: There are slight color spots due to separation between the elastic layer and the adhesive layer (potentially problematic for practical use).

Poor: There are color spots due to separation between the elastic layer and the adhesive layer (problematic for practical use).

-: The image quality evaluation is impossible because insufficient nip is formed due to the high hardness of the roller (problematic for practical use).

Example 2

A fixing roller is fabricated as in Example 1 except that the trimethylsiloxy-terminated dimethylsiloxane-methylhydrosiloxane copolymer (silicon-bonded hydrogen atom content: 3 mmol/g, viscosity (at 25° C.): 5 mPa·s) is added in an amount of 8 parts by mass. The fixing roller is evaluated as in Example 1.

Example 3

A fixing roller is fabricated as in Example 1 except that the trimethylsiloxy-terminated dimethylsiloxane-methylhydrosiloxane copolymer (silicon-bonded hydrogen atom content: 3 mmol/g, viscosity (at 25° C.): 5 mPa·s) is added in an amount of 4 parts by mass. The fixing roller is evaluated as in Example 1.

Example 4

A fixing roller is fabricated as in Example 1 except that the trimethylsiloxy-terminated dimethylsiloxane-methylhydrosiloxane copolymer (silicon-bonded hydrogen atom content: 3 mmol/g, viscosity (at 25° C.): 5 mPa·s) is added in an amount of 6 parts by mass. The fixing roller is evaluated as in Example 1.

Example 5

A fixing roller is fabricated as in Example 1 except that the adhesive layer has a thickness of 10 μm. The fixing roller is evaluated as in Example 1.

Example 6

A fixing roller is fabricated as in Example 1 except that the adhesive layer has a thickness of 5 μm. The fixing roller is evaluated as in Example 1.

Example 7

A fixing roller is fabricated as in Example 1 except that the adhesive layer has a thickness of 30 μm. The fixing roller is evaluated as in Example 1.

Example 8

A fixing roller is fabricated as in Example 1 except that the adhesive layer has a thickness of 50 μm. The fixing roller is evaluated as in Example 1.

Example 9

A fixing roller is fabricated as in Example 1 except that the adhesive layer has a thickness of 55 μm. The fixing roller is evaluated as in Example 1.

Comparative Example 1

A fixing roller is fabricated as in Example 1 except that the trimethylsiloxy-terminated dimethylsiloxane-methylhydrosiloxane copolymer (silicon-bonded hydrogen atom content: 3 mmol/g, viscosity (at 25° C.): 5 mPa·s) is added in an amount of 1.0 part by mass. The fixing roller is evaluated as in Example 1.

Comparative Example 2

A fixing roller is fabricated as in Example 1 except that the trimethylsiloxy-terminated dimethylsiloxane-methylhydrosiloxane copolymer (silicon-bonded hydrogen atom content: 3 mmol/g, viscosity (at 25° C.): 5 mPa·s) is added in an amount of 12 parts by mass. The fixing roller is evaluated as in Example 1.

Comparative Example 3

A fixing roller is fabricated as in Example 1 except that the trimethylsiloxy-terminated dimethylsiloxane-methylhydrosiloxane copolymer (silicon-bonded hydrogen atom content: 3 mmol/g, viscosity (at 25° C.): 5 mPa·s) is added in an amount of 2 parts by mass. The fixing roller is evaluated as in Example 1.

Comparative Example 4

A fixing roller is fabricated as in Example 1 except that the trimethylsiloxy-terminated dimethylsiloxane-methylhydrosiloxane copolymer (silicon-bonded hydrogen atom content: 3 mmol/g, viscosity (at 25° C.): 5 mPa·s) is added in an amount of 10 parts by mass. The fixing roller is evaluated as in Example 1.

TABLE 1

| | Amount of vinyl-containing dialkylpoly-organosiloxane (Vi) (parts by mass) | Amount of cross-linking agent (SiH) (parts by mass) | Ratio of remaining cross-linking groups to vinyl groups | Thickness of adhesive layer (μm) | Color spot |
|---|---|---|---|---|---|
| Example 1 | 100 | 2.2 | 1.1 | 20 | Good |
| Example 2 | 100 | 8 | 4.0 | 20 | Excellent |
| Example 3 | 100 | 4 | 2.0 | 20 | Excellent |
| Example 4 | 100 | 6 | 3.0 | 20 | Excellent |
| Example 5 | 100 | 2.2 | 1.1 | 10 | Good |

TABLE 1-continued

|  | Amount of vinyl-containing dialkylpoly-organosiloxane (Vi) (parts by mass) | Amount of cross-linking agent (SiH) (parts by mass) | Ratio of remaining cross-linking groups to vinyl groups | Thickness of adhesive layer (μm) | Color spot |
|---|---|---|---|---|---|
| Example 6 | 100 | 2.2 | 1.1 | 5 | Fair |
| Example 7 | 100 | 2.2 | 1.1 | 30 | Excellent |
| Example 8 | 100 | 2.2 | 1.1 | 50 | Good |
| Example 9 | 100 | 2.2 | 1.1 | 55 | Fair |
| Comparative Example 1 | 100 | 1.0 | 0.5 | 20 | Poor |
| Comparative Example 2 | 100 | 12 | 6.0 | 20 | — |
| Comparative Example 3 | 100 | 2.0 | 1.0 | 20 | Poor |
| Comparative Example 4 | 100 | 10 | 5.0 | 20 | — |

The fixing rollers of the Examples may have higher adhesion strengths between the elastic layer and the adhesive layer than those of the Comparative Examples. High adhesion strengths may prevent the separation between the elastic layer and the adhesive layer and may thus prevent color spots.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An adhesive for an adhesive layer of a fixing member comprising a substantially cylindrical substrate, an elastic layer around the substrate, a surface layer covering the elastic layer, and the adhesive layer between the elastic layer and the surface layer, the adhesive comprising:
    a dialkylpolyorganosiloxane having crosslinking groups; and
    a dialkylpolyorganosiloxane having vinyl groups,
    wherein the molar ratio of the crosslinking groups to the vinyl groups in the adhesive is about 1.1 to about 4.

2. A fixing member comprising:
    a substantially cylindrical substrate;
    an elastic layer around the substrate;
    a surface layer covering the elastic layer; and
    an adhesive layer between the elastic layer and the surface layer, the adhesive layer comprising a crosslinked product of a dialkylpolyorganosiloxane having crosslinking groups and a dialkylpolyorganosiloxane having vinyl groups,
    wherein the molar ratio of remaining crosslinking groups to crosslinked vinyl groups in the crosslinked product is about 0.1 to about 3.0.

3. The fixing member according to claim 2, wherein the adhesive layer has a thickness of about 10 μm or more.

4. A fixing device comprising the fixing member according to claim 2.

5. An image-forming apparatus comprising:
    an image carrier having a surface;
    a charging unit that charges the surface of the image carrier;
    a latent-image forming unit that forms an electrostatic latent image on the surface of the image carrier;
    a developing unit that develops the electrostatic latent image formed on the surface of the image carrier with a toner to form a toner image;
    a transfer unit that transfers the toner image to a medium; and
    a fixing device that fixes the toner image to the medium, the fixing device being the fixing device according to claim 4.

* * * * *